(12) United States Patent
Luisi et al.

(10) Patent No.: US 8,083,985 B2
(45) Date of Patent: Dec. 27, 2011

(54) METHOD FOR PRODUCING APPLIANCE CABINETS AND APPLIANCE CABINET PRODUCED BY SUCH METHOD

(75) Inventors: Armando Luisi, Varese (IT); Steven Kuehl, Stevensville, MI (US); Jon M. Anthony, Evansville, IN (US)

(73) Assignee: Whirlpool Corporation, Benton Harbor, MI (US)

( * ) Notice: Subject to any disclaimer, the term of this patent is extended or adjusted under 35 U.S.C. 154(b) by 890 days.

(21) Appl. No.: 11/913,951

(22) PCT Filed: May 9, 2006

(86) PCT No.: PCT/EP2006/062171
§ 371 (c)(1),
(2), (4) Date: May 20, 2008

(87) PCT Pub. No.: WO2006/120198
PCT Pub. Date: Nov. 16, 2006

(65) Prior Publication Data
US 2008/0309210 A1 Dec. 18, 2008

(30) Foreign Application Priority Data
May 10, 2005 (EP) .................................... 05103896

(51) Int. Cl.
*B29C 51/06* (2006.01)
*B29C 51/10* (2006.01)

(52) U.S. Cl. ........ 264/550; 264/549; 264/553; 264/554; 264/319; 264/320

(58) Field of Classification Search .................. 264/549, 264/550
See application file for complete search history.

(56) References Cited

U.S. PATENT DOCUMENTS

| | | | |
|---|---|---|---|
| 3,879,159 | A | 4/1975 | Smith |
| 6,537,477 | B1 | 3/2003 | Nichilo |
| 2003/0077344 | A1 | 4/2003 | Kato et al. |
| 2005/0098928 | A1 | 5/2005 | Rosenbaum et al. |

FOREIGN PATENT DOCUMENTS

| | | |
|---|---|---|
| DE | 19712140 A1 | 9/1998 |
| EP | 0535520 | 4/1993 |
| EP | 1367438 A2 | 3/2003 |
| JP | 200434656 | 5/2006 |

*Primary Examiner* — Monica A Huson
(74) *Attorney, Agent, or Firm* — Kirk W. Goodwin; McGarry Bair PC

(57) ABSTRACT

A method for producing appliance cabinets and the like, particularly a refrigerator cabinet having a double wall, whereby a polymeric sheet made plastic by thermal action is vacuum formed in a mold. The mold comprises a central male portion adapted to form the cavity of the cabinet and an annular female portion adapted to form the double wall of the cabinet, a plug assist device being used in order to drive the sheet in the female portion of the mold.

13 Claims, 3 Drawing Sheets

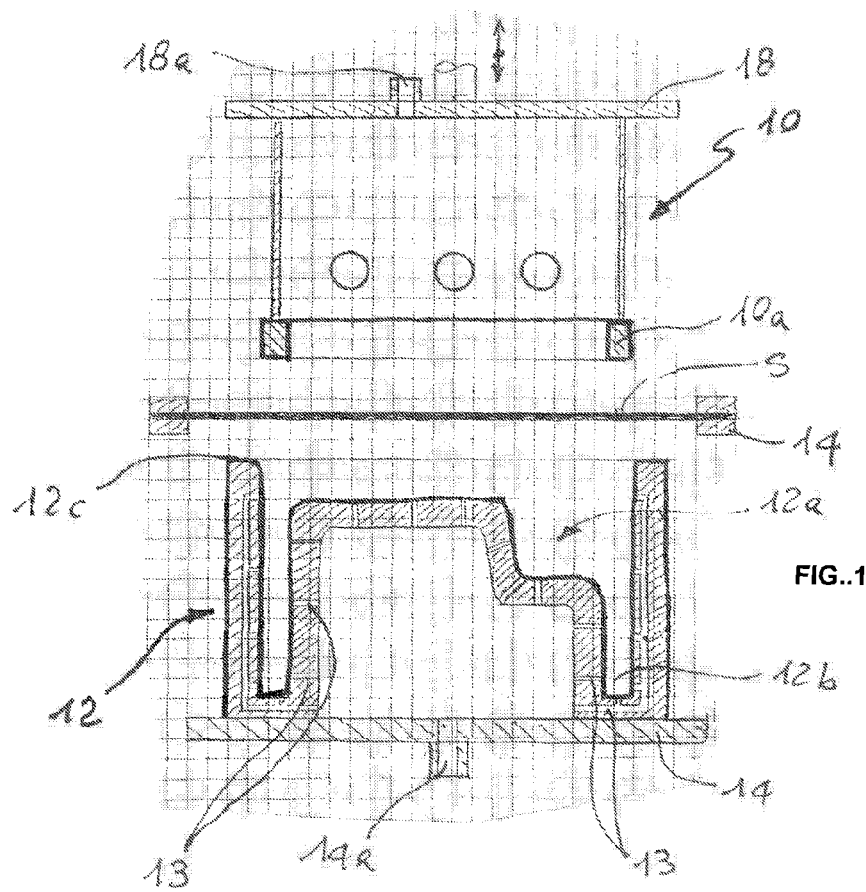
FIG..1
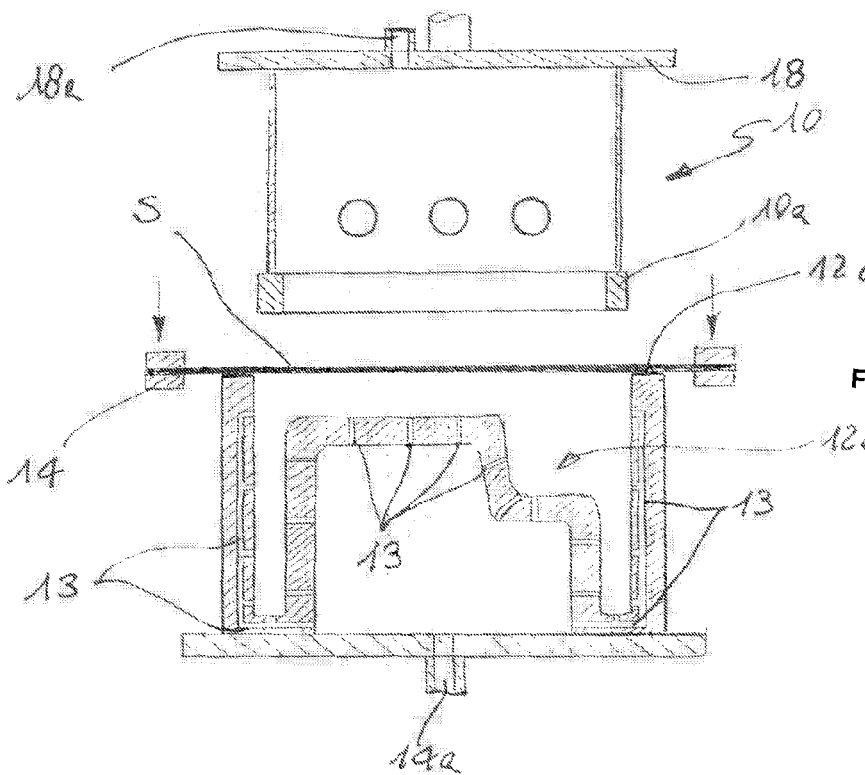
FIG..2

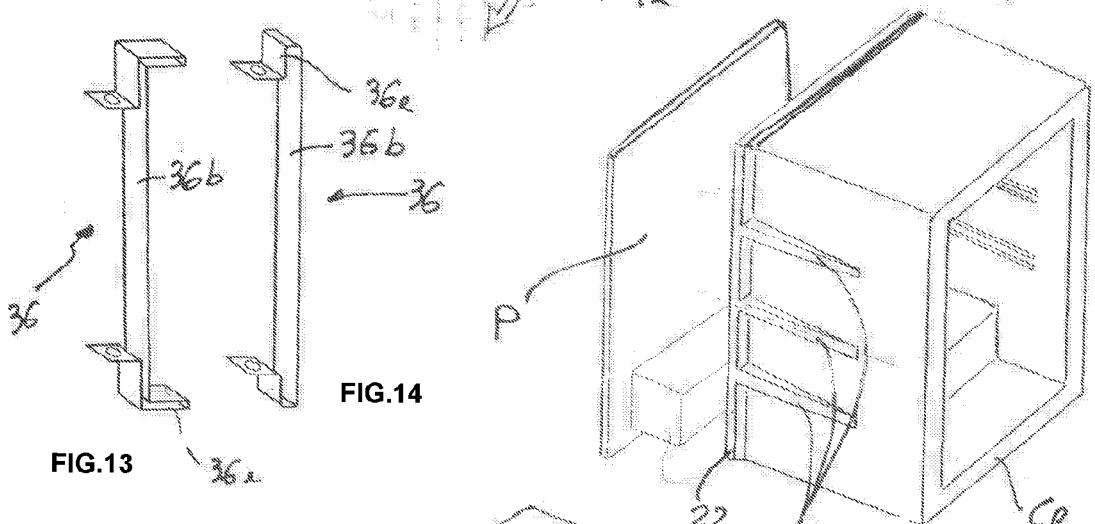
FIG..3
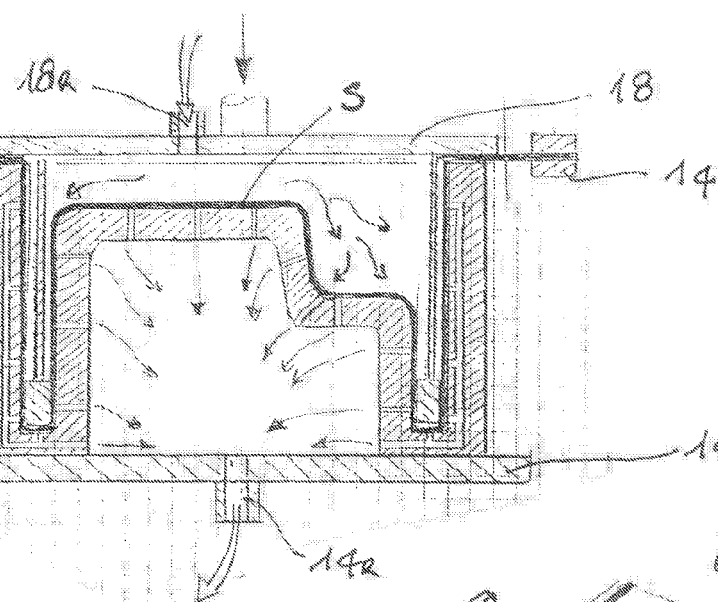
FIG..4
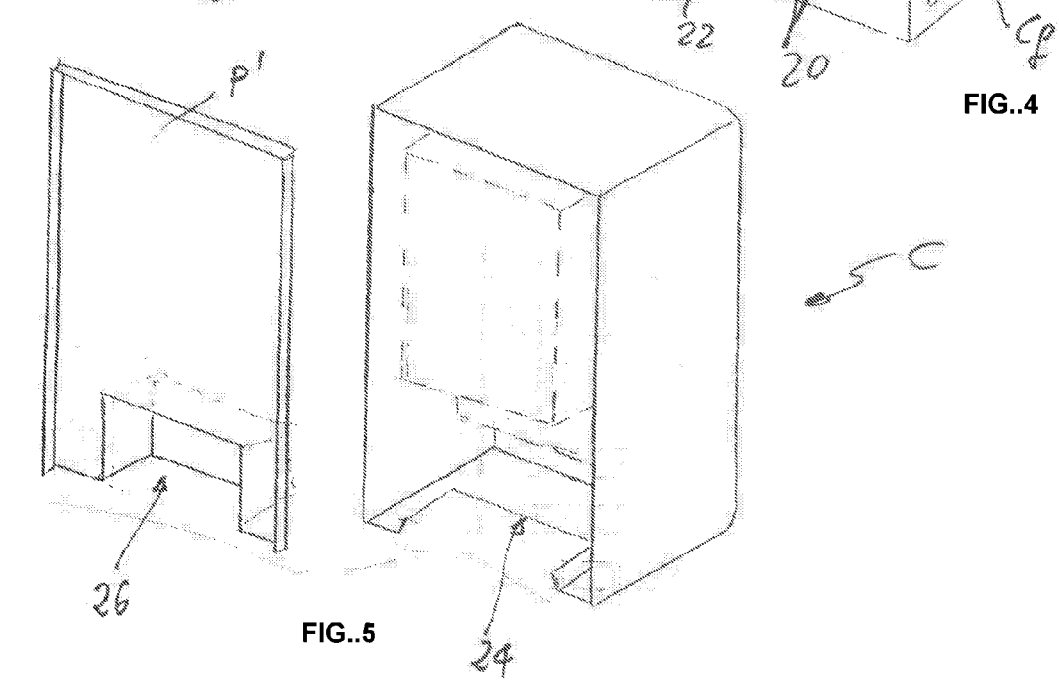
FIG.13
FIG.14
FIG..5

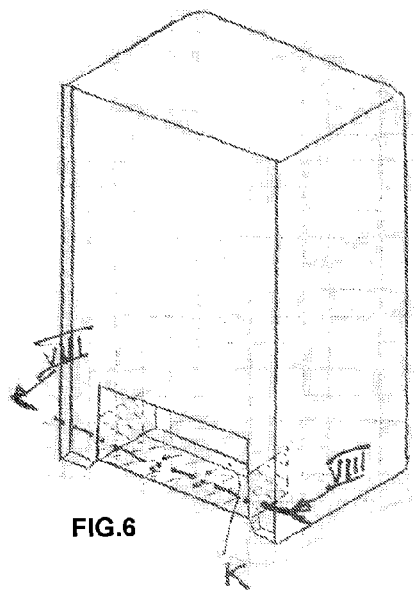
FIG.6
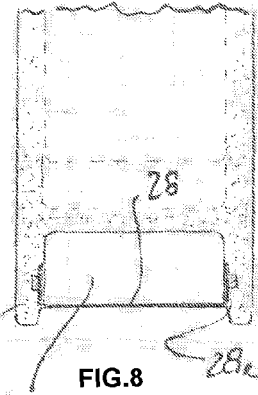
FIG.8
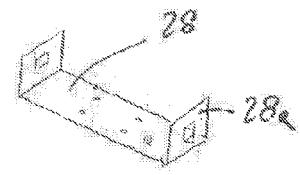
FIG.7
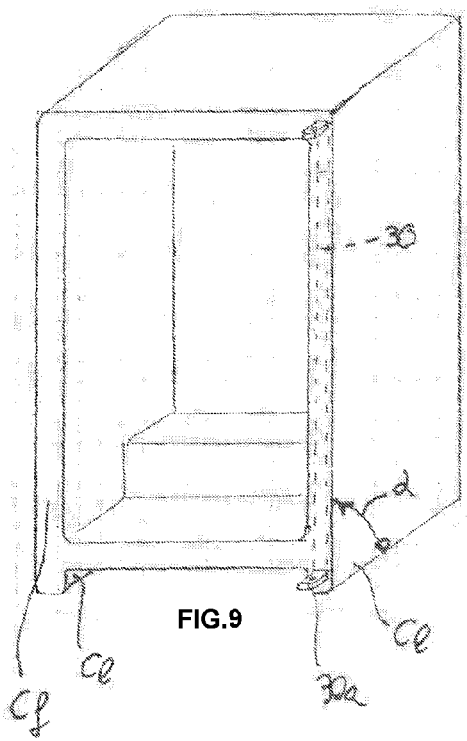
FIG.9
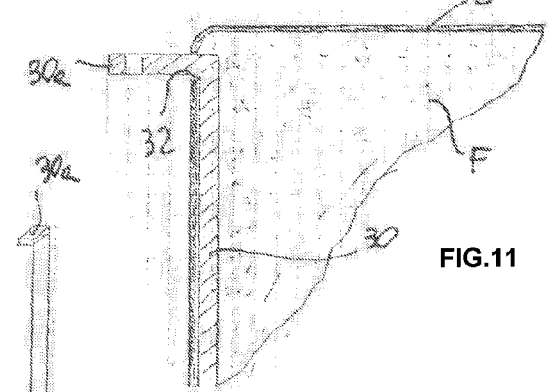
FIG.11
FIG.10
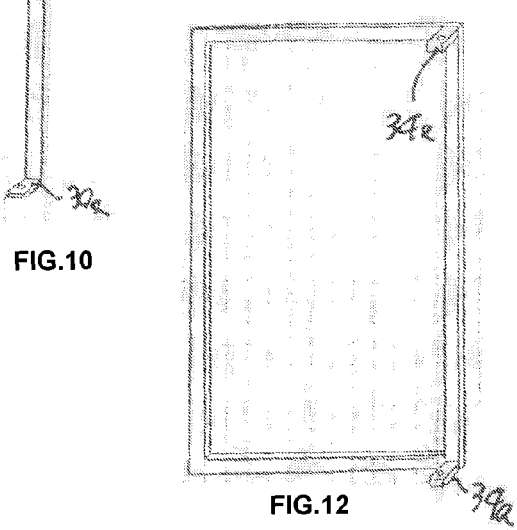
FIG.12

METHOD FOR PRODUCING APPLIANCE CABINETS AND APPLIANCE CABINET PRODUCED BY SUCH METHOD

CROSS-REFERENCE TO RELATED APPLICATIONS

This application claims priority on International Application No. PCT/EP2006/062171, filed May 9, 2006, which claims priority on European Application No. EP05103896.6, filed May 10, 2005.

This invention relates to a method for producing appliance cabinets and the like, especially refrigerator or dishwasher cabinets, whereby polymeric material sheets made plastic by thermal action are vacuum-formed in molds. The invention relates particularly to cabinets having a double wall, where with this term we mean the combination (at least for one side of the cabinet), of an internal wall facing and external wall, between such two walls being added an insulating and/or structural material, for instance a polymeric foam.

The invention also relates to the cabinets and the like, especially refrigerator or dishwasher cabinets, produced by such method.

A cabinet and a door make-up the simplest domestic refrigerator insulated enclosure. The structure of the cabinet, before foaming, typically is made by an inner liner (generally plastic thermoformed), an outer liner in steel and a back panel (a sheet of corrugate plastic or a metal sheet). Some other components are used to bring together the parts as the top and bottom brace and in some cases steel or plastic folded foil to make the compressor housing. The outer liner (left side, top and right side) can be made by a single folded steel foil or can be made by three different metal panels. The metal parts must be painted.

The parts need interlocking for assembly and the assembly operation needs specific tools, gigs, manpower and auxiliary material such as tape, adhesive, sealant, etc.

Although the design and the production process are optimised, the number of the parts and the number of the assembly operations are still high as above described.

There are already known methods for producing a double wall cabinet in an almost "single shot" operation, in which the inner liner and the outer liner (at least on four sides of the cabinet, i.e. top and bottom walls+two side walls) are formed together.

U.S. Pat. No. 3,091,946 describes a method for producing insulated cabinets by vacuum forming relatively thin synthetic material sheets having a thickness of about 4 mm. The synthetic materials used are polystyrene, polymethylstyrene, and their mixtures with styrene-butadiene or butadiene-acrylonitrile copolymers, acrylonitrile-butadiene-styrene terpolymers, styrene-acrylonitrile copolymers and others.

The known method consists of heating the synthetic material sheet, retained along its edges in a mobile frame, placing said sheet on a heatable mould comprising a cavity and ducts, feeding hot air into said cavity through the ducts so as to swell the sheet, introducing a heatable plug into the mould cavity, moving the mobile frame along the mould, and applying a vacuum through said ducts at the end of travel of the plug and frame to obtain adhesion of the sheet to the mold.

The described method does not allow relatively complex shapes to be obtained.

This is because this method, which operates simultaneously over the entire sheet area, results in different increases in the elementary areas into which the sheet can be ideally divided. with consequent critical thickness reductions in certain regions and the possibility of tearing.

A similar method is also disclosed by Italian Patent application IT21451A/87, wherein the vacuum forming is carried out in a number of stages that are separated by rest periods. Such known method does allow relatively complex shapes to be obtained, but is it quite slow and it has the drawback of inducing a sensible change in the thickness of the sheet after thermoforming, particularly relevant when the mold disposed below the sheet is raised, whereby its contour has a cooling effect on a portion of the sheet polymeric material, such portion remaining substantially of the same thickness during the following steps of the process, and this being cause of possible tearing of the polymeric film.

Another disadvantage of both the above known process is the poor quality surface of the interior of the cabinet, since this surface is not the one that comes into contact with the thermoforming mold.

The object of the present invention is to provide a vacuum-forming method starting from sheets of formable polymeric material that obviates the aforesaid drawbacks of known methods.

According to the invention, the forming method comprises the steps as specified in the appended claims.

According to the present invention it is possible to produce a complete structure cabinet with only two parts: the cabinet double wall liner in a single piece and the back panel, added afterwards. Both parts are made in plastic by thermoforming process. While the back panel is made by traditional molding, the liner is produced in a fast thermoforming process in which the surface of the sheet that remains visible, i.e. the interior and the exterior of the cabinet, providing a superior surface finish compared to the prior art.

Other features and advantages of the method according to the present invention will be clear from the following detailed description of one example of execution, with reference to the attached drawings in which:

FIGS. 1-3 are schematic cross views showing the process according to the invention, FIG. 4 shows a perspective view of a first embodiment of a cabinet obtained with a method according to FIGS. 1-3, FIG. 5-6 are perspective views, in an exploded configuration and in an assembled one respectively, of a second embodiment of the cabinet, FIG. 7 is a perspective view of a component of the cabinet of FIG. 6, FIG. 8 is a cross section along line VIII-VIII of FIG. 6, FIG. 9 is a perspective view of a cabinet according to the invention provided with a device for mounting the door, FIG. 10 is a perspective view of a component used in the cabinet of FIG. 9, FIG. 11 is a cross section along line XI-XI of FIG. 9, FIG. 12 is a variant of the component used for mounting a door in the cabinet according to the invention, and FIGS. 13-14 show two variants of the component of FIG. 10.

The thermoforming technology according to the invention uses a male/female type mold, i.e. a mold that is a combination of male and female technology. Practically the mold is female for the exterior section of the cabinet and it is male for the inner section (inner liner). The process doesn't use only the vacuum to form the plastic but it is combined with compressed air.

The plastic used is High Impact Polystyrene (HIPS) food grade, specially tailored for refrigeration products. The most suitable are "Polystyrol 2710" by BASF and "Edistir RR740E" by Polimeri Europa. Both materials have as main characteristics a Melt Flow Rate index of 4 g/10 min, Stress Cracking resistance against the Blowing agent and Extrusion and Thermoforming grade.

With reference to the drawings, the first step is to put a softened plastic sheet S between a crown-shaped plug assist 10 and a male/female mold 12 in an open position (FIG. 1). In this configuration a frame 14 supports the sheet S. The mold 12 has a central raised portion 12a (male) contoured by an annular groove-shaped portion 12b (female) facing a lower end 10a of the plug assist 10.

In a second step (FIG. 2) the frame 14 holding the sheet S goes down and therefore the sheet S is put into contact with an upper rim 12c of the mold 12. In the third step (FIG. 3) the plug assist 10 goes down and simultaneously air is evacuated between the sheet S and the mold walls by means of canalization 13 and a central conduit 14a in a support plate 14. At the same time pressurised air is blown through a central conduit 18a of a plate 18 supporting the plug assist 10. This air pressure helps in urging the sheet S against the mold wall.

In FIG. 4 a cabinet C as obtained in the above process is shown. Despite the fact that such cabinet C has features that make it fit as a cabinet for a refrigerator, it is clear that the process according to the invention may be used for producing cabinets for dishwashers or other similar appliances. The particular male/female mold used in the above process allows the shrinkage direction of the thermoformed sheet to be directed from the outer female section 12b of the mold 12 to the inner male section 12a thereof, so that an angle $\alpha$ of 90° (FIG. 9) can be obtained between a front face Cf of the cabinet and its levelers Cl, i.e. the raised bottom portions on which the cabinet C stands. Such levelers Cl are rectilinear and parallel and are placed substantially on the same planes defined by the two vertical side walls of the cabinet (C).

The embodiment of the cabinet shown in FIG. 4 has a plurality of ribs 20 and a rear flange 22. The ribs have a stiffening and aesthetic purpose. A back panel P to be connected to the flange 22 of the cabinet C is also shown in FIG. 4.

In FIG. 5 it is shown a possibility of producing a refrigerator in which the cabinet C is provided (at the end of its thermoforming process) with a cut-out 24 for forming, together with a thermoformed back panel P' having a recessed portion 26, a box-shaped receptacle 27 for the compressor and other accessories of the refrigerator. FIGS. 6-8 show a further step according to which a C-shaped compressor plate 28 is suspended in the box shaped receptacle 27.

According to the invention, it is particularly advantageous to insert the two bent end portions 28a of the compressor plate in the zone where insulating material will be injected. As it is clearly shown in FIG. 8, the two end portions 28a of the plate 28 are embedded in the polyurethane foam F. This allows saving fasteners and assembly operation. The width of the compressor plate 28 is such that a slot K is provided between the plate 28 and the wall of the box shaped receptacle so that a better ventilation of the compressor is allowed without enlarging the compressor housing.

In FIG. 9 a first way for fixing a door (not shown) to the cabinet C is shown. According to this version, a flat rod 30 (FIG. 10) with two bent ends 30a is placed in the thermoformed liner of the cabinet C before the insulating foam F is injected. The two ends 30a protrude from two horizontal slots 32 (FIG. 11) in the front edge Cf of the cabinet, so that they can be used for supporting a door. For refrigerators using magnetic system for maintaining the door closed, instead of the rod 30 a rectangular frame 34 can be used, as shown in FIG. 12, the frame having two protrusion 34a having the same function of the bent ends 30a of the rod 30. The above rod 30 and the frame 34 do not need any fastener for their mounting, since they are pressed against the corresponding edge Cf of the cabinet during the injection of the insulating foam.

FIGS. 13 and 14 show a bracket 36 similar to the one of FIG. 10 for mounting the door on the cabinet. Both versions of the bracket (made of heavy gage sheet metal) allow transfer of forces to floor. They are shown as symmetrical, but of course this is not necessary, since it is needed only one shaped end 36a for transferring the load of the door to the floor. In the version shown in FIG. 13, the bracket 36 allows a magnetic contact for maintaining the door closed. In the version according to FIG. 14, the central portion 36b of the bracket 36 is mounted away from the liner in order to minimise heat conduction at bracket liner interface from inside to outside surfaces of the cabinet.

The evaporator windings (not shown) can be placed in conjunction with a divider panel to provide a colder zone within the cavity for possibly making of ice.

Trial and pilot production have been carried out with Edistir RR740E.

The plastic sheets, produced by extrusion, had a thickness of 3.50 mm.

The thermoforming machine used was multi-station (loading station+oven station+forming/cooling station+unloading station) with "in-line" configuration.

The machine allowed a progressive heating of the sheet in such way to get an almost uniform distribution of the temperature through the sheet thickness. The temperature range was in between 160° C. to 180° C. The single heaters of the oven station were controlled one by one, that allowed a slightly different temperature mapping on the plastic sheet surface in accordance to the mold shape and this configuration.

This kind of machine, the molding parameters setting, the material grades and the limited thickness of the sheets allowed a cycle time in a range of 50 to 60 sec., i.e. much less than with previous known techniques.

The thickness distribution on the thermoformed cabinet was relatively consistent. The measurement analysis has been carried out on 41 points (21 on the vertical cross section and 20 on the horizontal cross section), and the overall average of the thickness was mm 0.9. The minimum thickness read was mm 0.63, this value being well above the minimum allowed by internal specification for plastic liners (0.50 mm).

The external size of the cabinet was height 830 mm, width 500 mm, depth 450 mm, while the internal dimensions were height 710 mm, width 400 mm, and depth 400 mm. The internal volume of the cabinet C was about 100 litres.

The process according to the invention allows avoiding the typical material accumulation on the corners, therefore allowing producing a cabinet with a good aesthetic. With the technology according to the invention the possible material accumulation is "inside" the cabinet facing towards the insulating material. Moreover, in the process according to the invention the "accumulation" is further reduced by the plug assist that stretches the plastic foil inside the walls of the female portion of the mold and so forming the "cabinet walls".

The technology according to the invention allows getting more sharp radii on the external corners and a better definition of the details due to the presence of compressed air inside the mold. Also this feature (pressure inside the mold) is suitable to get a better aesthetic finishing on the plastic surface (i.e. any kind of texture).

It is also possible to reduce the thickness of the plastic foil (around—30%) due to a better control of the stretching by the plug assist parameters (shape, material skidding plastic, variable speed, variable temperature, operating time).

It is possible to reduce the draft angle on the exterior section of the cabinet—female portion of the mold—(in our case only 1°) giving to the product a regular (squared) look. It is known in the art that to release the part from a male mold, the draft angle has to be large enough to compensate the shrinkage of the plastic during the cooling phase. With the mold according to the invention, when the plastic shrinks there is a natural detachment of the part from the female portion of the mold, such part being the outside walls of the cabinet.

The thermoforming process according to the invention allows some freedoms on the cabinet design that permits to integrate some features and saving components and assembly operation. For instance, the levelers (short legs on the bottom section of the cabinet) are formed with the cabinet. The female configuration of the mold allows having 0°-draft angle on the bottom side of the legs. That permits to have a refrigerator that is perfectly perpendicular on the floor.

The molding process according to the invention allows to put on the back of the exterior liner a flange (designed in aesthetic manner) to get a better rigidity. This flange will allow an easy positioning of the back panel without any gig and reducing the time for assembly operation.

The cabinet according to the present invention may be used for free standing or built-in appliances.

Moreover the cabinet according to the present invention can be used for a chest freezer, i.e. a freezer in which the opening of the cavity is on a horizontal plane and in which the back panel faces the floor. In this configuration (not shown), the door does not need any locking device or any magnetic system since it is kept closed by gravity. Without the metal brackets for side swing door, weight is reduced and outer surface condensation is greatly reduced because the conductive heat transfer path of the metal bracket is eliminated.

Another possible use of the cabinet according to the invention is as a refrigerated drawer, i.e. a cabinet inserted and/or sliding in a piece of furniture. In all the above applications, i.e. upright refrigerator or freezer, chest freezer and refrigerated drawer, the cabinet structure provides for compressor mounting orientation such that the refrigerator can be of the vertical cabinet or horizontal chest type. Moreover, the lightweight advantage of a cabinet according to the invention makes the cabinet suitable for mounting above the traditional counter top in the cupboard area of the kitchen. In this case the weight can be reduced via remote placement of condensing system and by further detaching the forced air cooling system (connected to the cabinet by in-flow and out-flow conduits).

The invention claimed is:

1. A method for producing a double-walled appliance cabinet having a cavity, comprising:
    placing a polymeric sheet on a mold having a central male portion and an annular female portion;
    drawing the polymeric sheet around the central male portion to form the cavity and into the annular female portion to form the double wall; and
    inserting a portion of a plug assist device into the annular female portion to drive the polymeric sheet into the annular female portion and form the double wall.

2. The method according to claim 1, comprising forming a plurality of stiffening ribs on at least one of the walls.

3. The method according to claim 1, wherein gas pressure is applied on a side of the sheet in contact with the plug assist device in order to stretch the sheet, together with vacuum on a other side of the sheet.

4. The method according to claim 1, comprising injecting an insulating foam into the double wall.

5. The method according to claim 4, comprising, forming a bottom portion of the cabinet with a cut out whose dimensions correspond to those of a recessed portion of a back panel in order to create a box-shaped receptacle for housing at least a component of the appliance.

6. The method according to claim 5, comprising mounting a support plate in the receptacle for supporting a compressor.

7. The method according to claim 6, embedding bent ends of the support plate into the insulation foam.

8. The method according to claim 4, comprising embedding in the foam a bracket having bent ends protruding from a front edge of the cabinet for supporting a door of the cabinet.

9. The method according to claim 8, wherein the bracket has an end that allows transfer of loads to a base of the cabinet.

10. The method according to claim 9, wherein the bracket is shaped to define a central portion that is not in contact with an inside wall of the front edge of the cabinet for allowing a flow of insulation material to reduce heat conduction path.

11. The method according to claim 4, comprising embedding in the foam a frame being in contact with an inner portion of a front edge of the cabinet and having two protrusions extending through the front edge for supporting a door.

12. The method according to claim 5, forming at least two raised portions, on which the cabinet stands, extending from the bottom portion.

13. The method according to claim 12, wherein said raised portions are rectilinear and parallel and are situated substantially on the planes defined by two side vertical walls of the cabinet.

* * * * *